United States Patent [19]

Ushiro

[11] Patent Number: 4,722,015
[45] Date of Patent: Jan. 26, 1988

[54] RECORDING AND REPRODUCING APPARATUS USING A PLURALITY OF KINDS OF MAGNETIC HEADS

[75] Inventor: Tatsuzo Ushiro, Tokyo, Japan

[73] Assignee: Canon Kabushiki Kaisha, Tokyo, Japan

[21] Appl. No.: 513,235

[22] Filed: Jul. 13, 1983

[30] Foreign Application Priority Data

Jul. 19, 1982 [JP] Japan ................................. 57-125266

[51] Int. Cl.⁴ ............................................... G11B 5/40
[52] U.S. Cl. .................................. 360/128; 360/105; 360/84
[58] Field of Search ................... 360/105, 107, 95, 84, 360/85, 75, 70, 137, 66, 113, 110, 132, 128

[56] References Cited

U.S. PATENT DOCUMENTS

| | | | |
|---|---|---|---|
| 3,076,060 | 1/1963 | Horstkorta | 360/105 |
| 3,685,171 | 8/1972 | Kosaka | 360/132 |
| 3,900,889 | 8/1975 | Broghammer | 360/66 |
| 4,135,218 | 1/1979 | Nakamura et al. | 360/110 |
| 4,475,137 | 10/1984 | Yasuda et al. | 360/126 |

FOREIGN PATENT DOCUMENTS

| | | | |
|---|---|---|---|
| 023067 | 1/1981 | European Pat. Off. | 360/84 |
| 52-010712 | 1/1977 | Japan | 360/95 |
| 54-073616 | 6/1979 | Japan | 360/105 |
| 55-052560 | 4/1980 | Japan | 360/75 |

OTHER PUBLICATIONS

Yasuda et al., "Newly Developed Sendust Video Head for High Coercive Tape", IEEE Transactions on Magnetics, vol. MAG-16, No. 5, Sep. 1980, pp. 870–872.
Bendson, "New Wear-Resistant Permalloy Material for Magnetic Recording-Heat Application", Journal of the Audio Engineering Society, vol. 24, No. 7, Sep. 1976, pp. 562–567.

*Primary Examiner*—John H. Wolff
*Assistant Examiner*—Matthew J. Bussan
*Attorney, Agent, or Firm*—Toren, McGeady & Associates

[57] ABSTRACT

Disclosed is a recording and/or reproducing apparatus which includes heads of at least two different kinds, carrying apparatus for receiving a recording medium, discriminating apparatus for discriminating the recording medium being carried by the carrying apparatus, selecting apparatus for selecting one kind of head from the different kinds. This occurs in response to the discriminating apparatus and control apparatus which is provided for at least one kind of head selected from different kinds to control head contact with the recording medium in response to the selecting apparatus.

5 Claims, 9 Drawing Figures

RECORDING AND REPRODUCING APPARATUS USING A PLURALITY OF KINDS OF MAGNETIC HEADS

BACKGROUND OF THE INVENTION

1. Field of the Invention:

This invention relates to a recording and/or reproducing apparatus and more particularly to a recording and/or reproducing apparatus selectively using one kind of head among different kinds of heads, depending on the kind of recording medium to be used.

2. Description of the Prior Art:

In this specification, magnetic recording and/or reproducing apparatus of the rotary two-head type using a magnetic tape as the recording medium (hereinafter called VTR) will be described by way of example.

During recent years, there have been conspicuous improvements in the properties of magnetic materials. For example, magnetic recording density on a recording medium has been improved by the use of an alloy powder tape (hereinafter called the metal tape), a vapor deposition or evaporation tape, or the like. As a result, it has recently become possible to record signals of 4 to 5 MHz even at a relative speed of 3 m/sec. At present, approximately the same picture quality can be obtained from the metal tape and the evaporation tape. It is difficult to predict what kind of tape will be chiefly used in the future. Therefore, it is desirable for the current VTR's to permit video signal recording on both the metal tape and the evaporation tape by advantageously utilizing their respective characteristics and also to reproduce recorded video signals from both.

However, the metal tape has a large coercive force as a magnetic characteristic. When the metal tape is used, therefore, magnetic recording cannot be adequately accomplished with a head employing ferrite or the like as a core member. Hence, VTR's adapted for use with the metal tape generally use a head employing Sendust, which is an Fe-Si-Al alloy. However, the head employing Sendust is harder than the head employing ferrite and is brittle against an external force. The Sendust head is also inferior to the ferrite head in terms of its antifriction property.

A head usable for recording media of all kinds inevitably has a shorter service life or is expensive. In the VTR, use of both the evaporation tape and the metal tape necessitates use of the Sendust head. However, the short life of the Sendust head inevitably shortens the service life of the VTR.

Such being the shortcoming of the prior art VTR's, it is an object of the present invention to provide a recording and/or reproducing apparatus in which the contact of a head with a recording medium is controlled to ensure long life as well as to render the apparatus operable on recording media of at least two different kinds, advantageously utilizing their characteristics.

It is another object of the invention to provide a video signal recording and/or reproducing apparatus in which the contact of a rotary head with a magnetic tape is controlled by selecting, from two different kinds of rotary heads a head that is suited for the magnetic tape being used.

It is another object of the invention to provide a rotary head assembly which controls contact of a rotary head with a magnetic tape.

Still another object of the invention is to provide a head driving device of a simple structural arrangement, which is capable of driving a head perpendicular to a sliding contact plane between the head and a recording medium.

These and further objects and features of the invention will become apparent from the following detailed description of preferred embodiments thereof taken in conjunction with the accompanying drawings.

SUMMARY OF THE INVENTION

The objects of the invention are attained in a magnetic recording apparatus and/or reproducing apparatus which comprises first and second magnetic heads of two different kinds. For example, the magnetic heads may differ in durability and magnetic characteristics. The apparatus includes carrying means for carrying a recording medium, discriminating means for discriminating the kind of recording medium carried by the carrying means. In addition, the apparatus includes selecting means for selecting a particular head in response to the discriminating means and control means for controlling the contact of the heads with the recording medium in response to the selecting means. The control means is provided for at least one of the two kinds of heads in the apparatus.

DETAILED DESCRIPTION OF PREFERRED EMBODIMENTS

Figure 1:
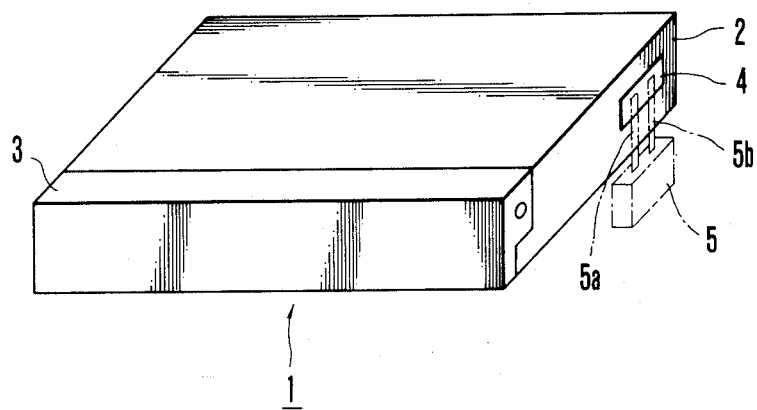
FIG. 1 is an illustration showing by way of example parts related to discriminating means arranged in accordance with the invention.

Referring to FIG. 1, parts relative to discriminating means of a recording and/or reproducing apparatus (VTR) according to the present invention include a cassette 1 which contains a magnetic tape; a container member 2 containing cassette 1 reels; a front lid part 3 of the cassette; and a detection member 4 which is for detection of the kind of the magnetic tape contained within the cassette 1. The detection member 4 is, for example, an electric conductor when the cassette 1 contains a metal tape and is a non-conductor when the cassette 1 contains a tape that permits recording or reproduction with a ferrite head, such as a vapor deposition or evaporation tape or the like. On the side of the apparatus is provided a switch 5. When the VTR is loaded with the cassette 1, the contact pieces 5a and 5b of the switch 5 contact the detection member 4. In the situation where a conductor is arranged as the detection member 4, the switch 5 turns on when the VTR is loaded with the cassette 1. When a non-conductor is arranged as the detection member 4, the switch 5 remains off when the VTR is loaded with the cassette 1. In other words, the kind of magnetic tape used is discriminatory and the switch 5 only turns on when metal tape is contained in the cassette 1.

Figure 3:
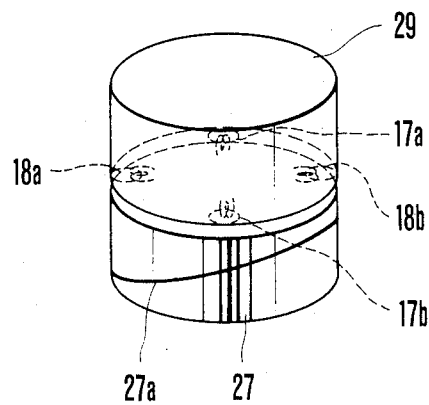
FIG. 3 is a perspective view showing the head arrangement of the VTR of FIG. 2.
Figure 2:
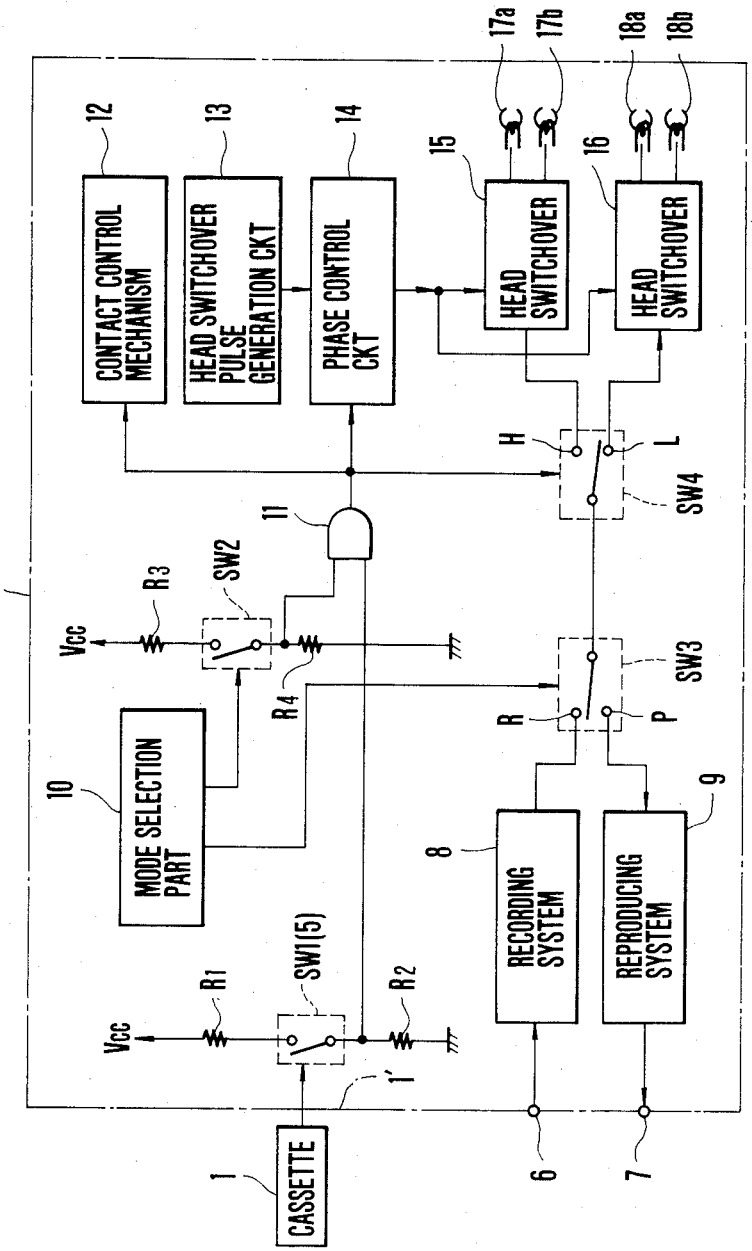
FIG. 2 is a circuit diagram showing the arrangement of a VTR according to the invention.

An example of the circuit arrangement of the VTR, according to the invention, is shown in FIG. 2. The head arrangement of the VTR is as shown in FIG. 3. Referring to FIG. 2, a cassette loading part 1' of the body 100 of the VTR is loaded with the cassette 1 which is provided with the detection member 4 to be detected, as shown in FIG. 1. The detection switch 5 turns on when a metal tape is to be used. Resistors R1 and R2 are provided for distributing a power source voltage Vcc to the input terminal of an AND gate 11. The VTR is provided with a known recording circuit 20 including a video signal input terminal 6, a video signal output terminal 7, an FM modulation circuit 8, a frequency conversion circuit, etc. The VTR is further provided with a mode selection part 10 including a switch for switch-over between recording, reproducing, quick feeding and quick rewinding modes, etc. When the mode selection part 10 is set at the recording mode position, a switch SW2 turns on and a switch SW3 is connected to one side R thereof, as shown in FIG. 2. When using the reproducing mode, the switch SW3 is connected to the other side P.

With the switch SW2 turned on, a voltage obtained by distributing the power source voltage Vcc via resistors R3 and R4 (higher than the threshold voltage of the AND gate 11) is supplied to the AND gate 11. The AND gate 11 then produces a high level output when both the switches SW1 and SW2 are on. In other words, the AND gate 11 produces a high level output only when a metal tape is used in the recording mode.

The output of the AND gate 11 is supplied to a contact control mechanism 12, a phase control circuit 14 and a switch SW4. The contact control mechanism 12 brings a Sendust head, which is not shown, into contact with a magnetic tape when the AND gate 11 produces an output.

There is provided a head switch-over pulse generation circuit 13 which produces head switch-over pulses in response to rotary drum phase detection pulses or a vertical synchronizing signal of a video signal, etc. Meanwhile, it is impossible to have Sendust heads 17a and 17b and ferrite heads 18a and 18b arranged in the same places. Referring to FIG. 3, a head assembly consists of a stationary lower drum 27, which is provided with a tape guide body 27a and a rotary upper drum 29. In this head assembly, the pair of heads 17a and 17b and another pair of heads 18a and 18b are mounted on the rotary upper drum 29 at locations respectively differing by 180° in phase angle from each other, within each paired arrangement. Meanwhile, there is a phase angle difference of, say, 90° between the head 17a and the head 18a. The head phase obtained with the Sendust heads 17a and 17b used, therefore, differs from the head phase obtained with the ferrite heads 18a and 18b used. Therefore, the phase of the head switch-over pulse must be varied as much as the head phase difference by means of the phase control circuit 14. In the specific example shown in FIG. 2, the phase of the head switch-over pulses is varied when the AND gate 11 produces an output, i.e. when the Sendust heads 17a and 17b are used, while the pulses are produced on the assumption that the VTR normally uses the ferrite heads 18a and 18b. The switch SW4 is provided for selection of the kind of the head to be used. When there is an output from the AND gate 11, the switch SW4 is connected to one side H thereof permitting recording or reproduction with the Sendust heads 17a and 17b. When no output is produced from the AND gate 11, the switch SW4 is connected to the other side L, as shown in FIG. 2, permitting recording or reproduction with the ferrite heads 18a and 18b.

Figure 4:
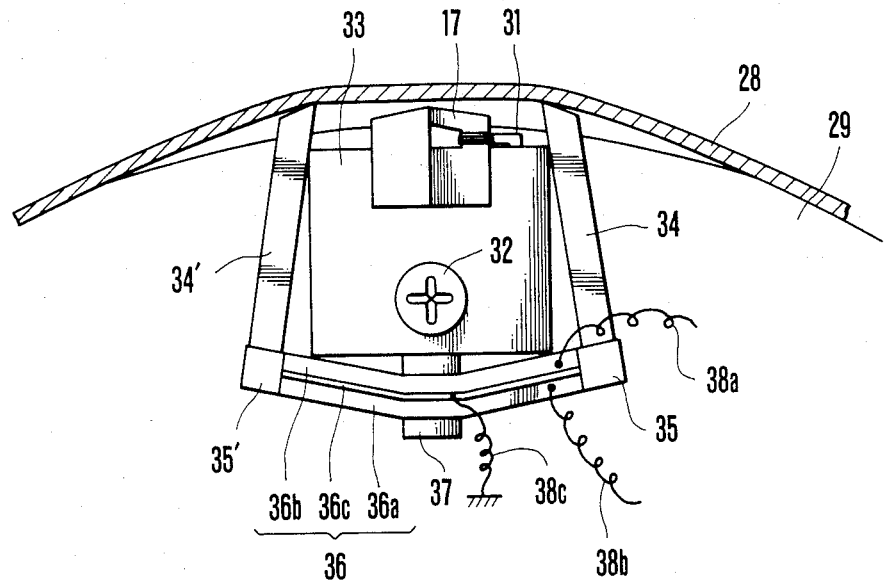
FIG. 4 is a partially schematic view of an example of the control means structural arrangement employed in the VTR according to the invention.

An example of the head driving mechanism 12 (a contact control mechanism 12) is arranged as shown in FIG. 4. In FIG. 4, the reference numeral 28 identifies a magnetic tape and the rotary upper drum is identified by the reference numeral 29. The rotary drum 29 is shown as viewed in its axial direction. The Sendust head 17 is provided with a winding 31. A head base 33 is secured to the rotary drum 29 by means of a screw 32. In using a metal tape in the recording mode, that is, when the AND gate 11 of FIG. 2 produces a high level output, the Sendust head 17 sufficiently protrudes adequately permitting signal recording on the magnetic tape 28 and is secured in place by the screw 32. Guard plates 34, and 34' which serve as cover members, keep the Sendust head 17 away from the magnetic tape 28 preventing the former from coming into contact with the latter. The guard plates 34 and 34' are attached to support blocks 35 and 35' provided at two ends of a bimorph block 36, which is composed of a pair of piezoelectric elements 36a and 36b and an electric conductor 36c. A supporting fulcrum 37 is provided for the block 36.

Figure 5:
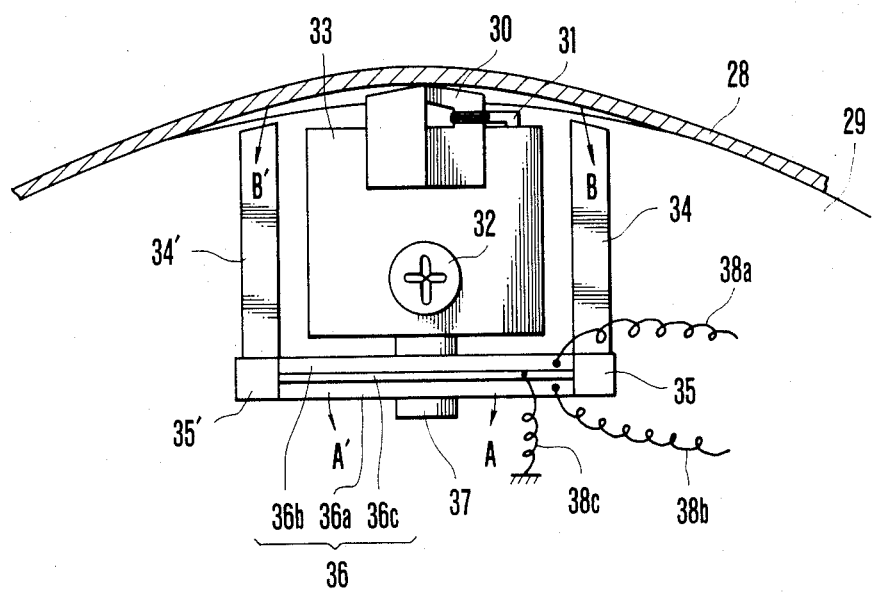
FIG. 5 is a view similar to FIG. 4 showing the control means of FIG. 4 in an energized state.

The head driving mechanism 12 operates as follows: When the AND gate 11 shown in FIG. 2 produces an output, a driving voltage is supplied to terminals 38a and 38b of the block 36. FIG. 5 shows the head driving mechanism 12 of FIG. 4 having the driving voltage applied thereto. With the driving voltage applied to the terminals 38a and 38b, the block 36 is bent in the directions of arrows A, and A' as shown in FIG. 5. This causes the guard plates 34 and 34' to move in the directions of arrows B and B' so that these plates 34 and 34' no longer protrude from the rotary drum 29. As a result, the Sendust head 17 sufficiently protrudes, contacting the magnetic tape 28 for adequate signal recording thereon.

In accordance with the arrangement of the specific embodiment of the invention as shown in FIGS. 1-5, the Sendust heads are 17a, 17b used only when a metal tape is to be used and only in the recording mode. With the exception of such limited occasions, the Sendust heads 17a, 17b never come in contact with the magnetic tape 28. The invented arrangement effectively reduces the frequency of use of the Sendust heads 17a, 17b which are inferior in durability, so that the service life of the VTR can be lengthened. The ferrite heads 18a, l 18b may be provided with a similar mechanism. However, the life of the ferrite heads 18a, 18b is by far longer than that of the Sendust head 17. Therefore, frequent contact of the ferrite heads 18a, 18b with the magnetic tape 28 presents no problem.

Figure 6:
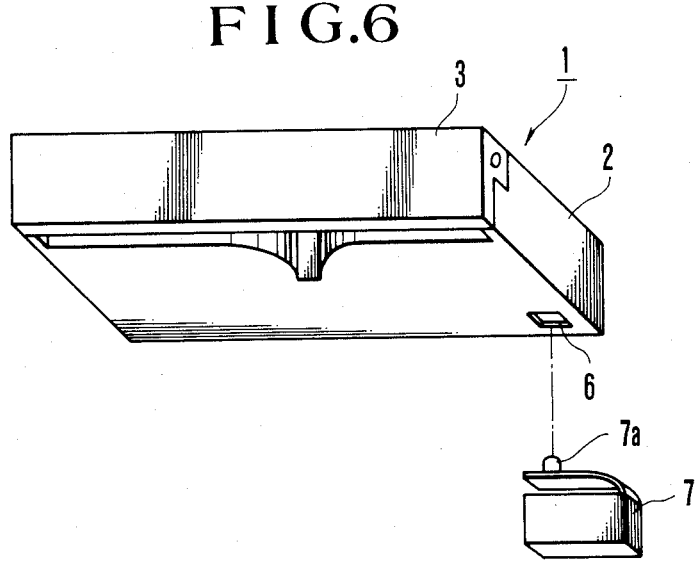
FIG. 6 is a partially schematic view of another example of the parts related to discriminating means of the invention.

FIG. 6 shows another example of parts related to discriminating means arranged in accordance with the present invention. In this example, a hole 6 for detecting the kind of tape is provided in the bottom part of the cassette 1. The example is applicable to the circuit arrangement of FIG. 2 in the following manner: The hole 6 is provided in the cassette 1 containing a tape of the kind such as a vapor deposition tape (or an evaporation tape) that permits recording or reproduction with a ferrite head 18. Meanwhile, when the cassette 1 contains a metal tape, the hole 6 is plugged. A switch 7 is in a position corresponding to the hole 6 and does not turn on when the VTR is loaded with the cassette 1 containing a vapor deposition tape, since the protruding part 7a of the switch 7 is allowed to enter the hole 6 in that instance. However, when the VTR is loaded with the cassette 1 containing a metal tape, the protruding part 7a is pushed by the cassette 1 turning on the switch 7.

Figure 7:
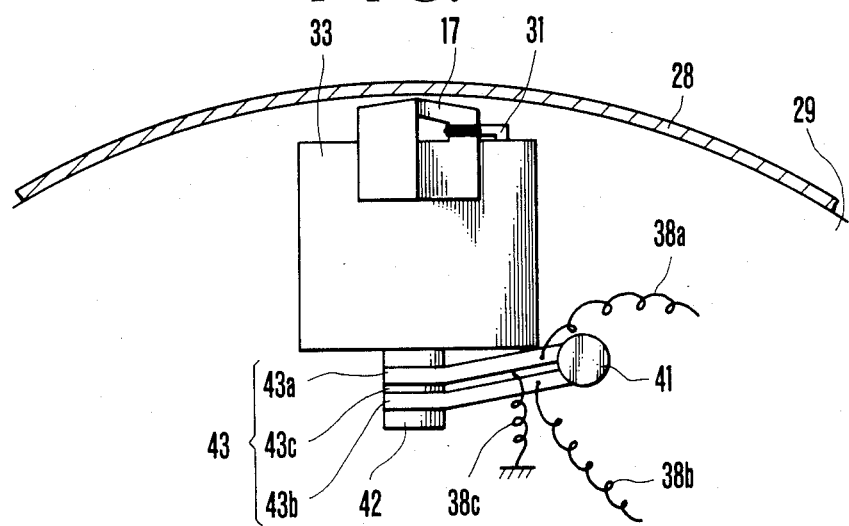
FIG. 7 is a partially schematic view of another example of the control means structural arrangement employed in the VTR according to the invention.

FIG. 7 shows another example of the head driving mechanism 12. In FIG. 7, the same parts as those shown in FIG. 4 are indicated by the same reference numerals. A bimorph block 43, which is composed of piezo-electric elements 43a and 43b and a conductor 43c, is attached to a fulcrum 41. A support block 42, which is connected to a head base 33, is attached to the block 43. A driving voltage is supplied from the head driving circuit 12, shown in FIG. 2, to the terminals 38a and 38b.

Figure 8:
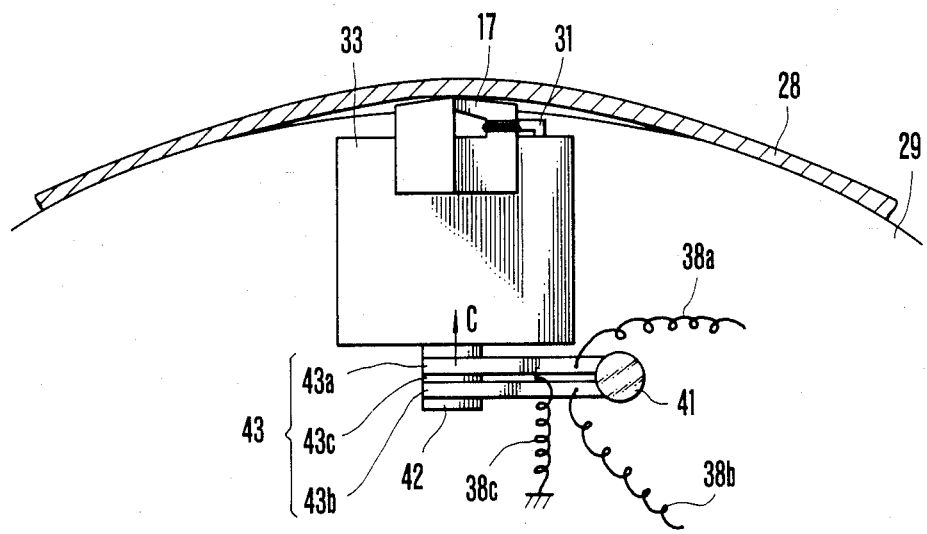
FIG. 8 is a view similar to FIG. 7 showing the structural arrangement of FIG. 7 in an energized state.

FIG. 8 shows the head driving mechanism 12, shown in FIG. 7, having the driving voltage applied thereto. With the driving voltage applied to the piezo-electric elements 43a and 43b, the block 43 bends in the direction of arrow C, as shown in FIG. 8. As a result, the Sendust head 17 protrudes from the outermost periphery of the rotary drum 29 and thus contacts the magnetic tape 28. This permits signal recording on the magnetic tape 28 with the Sendust head 17. When the driving voltage is not supplied to the piezo-electric elements 43a and 43b, the Sendust head 17 does not contact the magnetic tape 28, as shown in FIG. 7.

Figure 9:
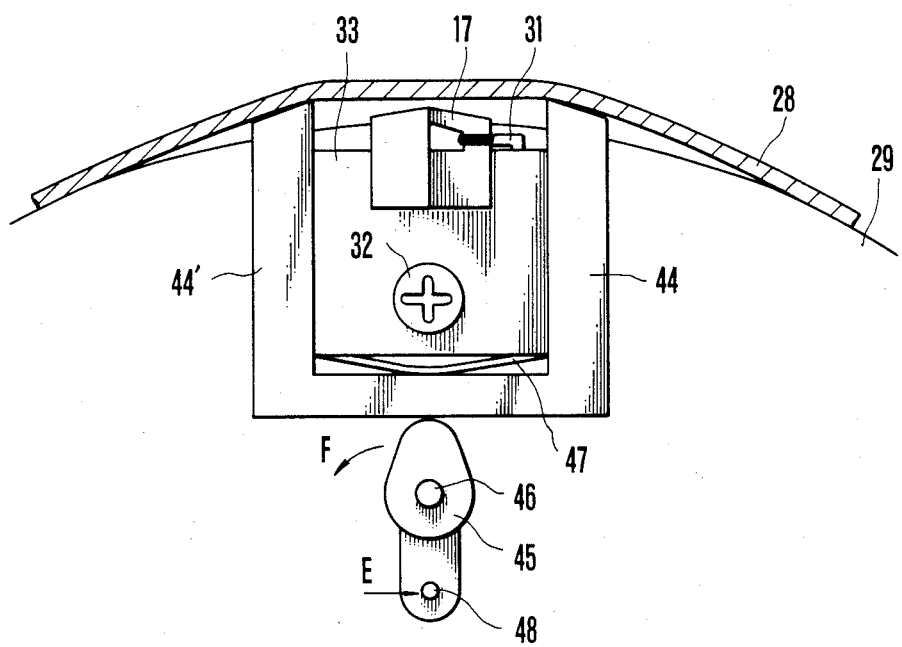
FIG. 9 shows a further example of the structural arrangement of control means according to the invention.

A further example of the head driving mechanism 12 is shown in FIG. 9, in which the parts identical with those shown in FIG. 4 are indicated by the same reference numerals. The mechanism includes guard plates 44 and 44' which serve as cover members; a pushing piece 45 which pushes the guard plates 44 and 44'; a fulcrum 46 of the pushing piece 45; an elastic member 47; and a pushing point 48 provided for the pushing piece 45.

When an output is produced from the AND gate 11 shown in FIG. 2, power is supplied to an actuator, which is not shown but which consists of a solenoid circuit, etc. Then the actuator pushes the pushing point 48 in the direction of arrow E, as shown in FIG. 9. This turns the pushing piece 45 in the direction of arrow F. The guard plates 44 and 44' then move downward by virtue of the elastic member 47. This allows the Sendust head 17 to contact the magnetic tape 28. When there is no output from the AND gate 11 on the other hand, the head driving mechanism 12 is as shown in FIG. 8 and the Sendust head 17 does not contact the magnetic tape 28.

It goes without saying that the use of the discriminating means and the head driving mechanism 12, arranged as shown in FIGS. 6 to 9, also give the same effect as in the arrangement shown in FIGS. 1 to 4.

In the embodiments described above, the detecting member 4 is arranged at the tape containing cassette 1 as a means for detecting the kind of the tape and the VTR detects this detecting member 4. However, this method, of course, can be replaced with some other method in which, for example, the kind of tape is detected by the magnetic characteristic electric resistance or other electric characteristics of the tape.

The circuit arrangement shown in FIG. 2 is nothing but an example, while many variations and modifications may be arranged according to the discriminating means and the head selecting means employed.

Furthermore, in this specification, the apparatus having two kinds of heads, including the ferrite head 18 and the Sendust head 17, has been described by way of example. However, the invention is not limited to the use of such heads 17, 18, but is applicable to an apparatus using other heads suited for use of any recording media to be developed in the future. For example, in an apparatus having three kinds of heads, it is conceivable that the apparatus uses heads of one kind while keeping the other heads out of contact with the recording medium.

While a VTR of the two-head type has been described, the present invention is also applicable to other recording and/or reproducing apparatus having more than two kinds of heads.

As apparent from the foregoing description of the embodiments, the invented arrangement controlling the head contact with the recording medium not only permits use of recording media of at least two different kinds but also provides recording and/or reproducing apparatus with a very long service life.

What I claim:

1. A rotary head assembly, comprising:
   two cylinder members which are arranged to have their bottom faces opposed to each other and to guide a magnetic tape by their peripheral surfaces;
   a rotary head interposed in between said two cylinder members, said head being arranged to protrude from said peripheral surfaces;
   a cover member arranged to be operative for covering said rotary head; and
   control means arranged to drive said cover member to move in the diametrical direction of the cylinder members and to control the contact of said head with the magnetic tape which is being guided by said peripheral surfaces of the cylinder members.

2. An assembly according to claim 1, wherein one of the two cylinder members is a stationary cylinder and the other a rotary cylinder.

3. An assembly according to claim 2, wherein said control members include a pair of piezo-electric elements for driving said cover member to move in the diametrical direction of said rotary cylinder.

4. An assembly according to claim 3, wherein said pair of piezo-electric elements have said cover member attached to their two ends and have their middle parts secured to said rotary cylinder.

5. An assembly according to claim 2, wherein said control means includes an elastic member which urges said cover member toward the center of said rotary cylinder and an eccentric cam which is arranged to push said cover member in the diametrical direction of said rotary cylinder against the force of said elastic member.

* * * * *